(12) United States Patent
Smolinski et al.

(10) Patent No.: US 9,128,994 B2
(45) Date of Patent: Sep. 8, 2015

(54) VISUALLY REPRESENTING QUERIES OF MULTI-SOURCE DATA

(71) Applicant: Microsoft Corporation, Redmond, WA (US)

(72) Inventors: Adam Smolinski, North Blend, WA (US); Michael Ebstyne, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 13/802,739

(22) Filed: Mar. 14, 2013

(65) Prior Publication Data

US 2014/0280045 A1    Sep. 18, 2014

(51) Int. Cl.
  *G06F 17/30*  (2006.01)
  *G06F 7/00*   (2006.01)

(52) U.S. Cl.
  CPC .... *G06F 17/30554* (2013.01); *G06F 17/30696* (2013.01)

(58) Field of Classification Search
  CPC ............ G06F 17/30696; G06F 17/211; G06F 17/30569
  USPC ................................................. 707/723, 722
  See application file for complete search history.

(56) References Cited

U.S. PATENT DOCUMENTS

| | | | | |
|---|---|---|---|---|
| 6,026,409 A * | 2/2000 | Blumenthal | ........... | 707/999.004 |
| 6,839,702 B1 * | 1/2005 | Patel et al. | ............. | 707/999.003 |
| 6,853,922 B2 * | 2/2005 | Stark | ............................... | 702/14 |
| 6,934,415 B2 * | 8/2005 | Stentiford | ..................... | 382/205 |
| 7,065,520 B2 * | 6/2006 | Langford | ...................... | 707/769 |
| 7,177,948 B1 * | 2/2007 | Kraft et al. | .................... | 709/246 |
| 7,624,101 B2 * | 11/2009 | Lin et al. | ................ | 707/999.002 |
| 8,155,931 B2 | 4/2012 | Rubin et al. | | |
| 8,266,148 B2 | 9/2012 | Guha et al. | | |

(Continued)

FOREIGN PATENT DOCUMENTS

WO    2008/067116 A1    6/2008

OTHER PUBLICATIONS

Venkatech et al, "Tap Into True Value of Analytics", Retrieved at <<http://www.infosys.com/FINsights/Documents/pdf/issue8/convergence-structured-analytics.pdf>>, FINSights, pp. 12, Retrieved Jan. 3, 2013.

(Continued)

*Primary Examiner* — Pavan Mamillapalli
(74) *Attorney, Agent, or Firm* — Jim Banowsky; Kate Drakos; Micky Minhas

(57) ABSTRACT

The present invention extends to methods, systems, and computer program products for visually representing queries of multi-source data. Embodiments of the invention can be used to visually represent queries of multi-source data. Visual cues can be used to help surface insights into data sets. For example, keywords can be assigned colors. Within a data set, the keywords can be presented as colored highlights (i.e., individual keywords can be displayed using different colors). Presentation of multiple colored highlighted keywords can be optimized for quick visual consumption. As such, a user can more easily determine the volume of keywords within a data set and can identify trends in keyword volume over time. A "mountaintop view" of an entire data set can be presented to show highlighted words within the data set as color blocks without having to scroll.

20 Claims, 8 Drawing Sheets

(56) References Cited

U.S. PATENT DOCUMENTS

| | | |
|---|---|---|
| 2004/0080532 A1* | 4/2004 | Cragun et al. ............... 345/745 |
| 2005/0028108 A1 | 2/2005 | Baudisch et al. |
| 2006/0156222 A1 | 7/2006 | Chi et al. |
| 2007/0011134 A1 | 1/2007 | Langseth et al. |
| 2009/0299998 A1 | 12/2009 | Kim |
| 2011/0055691 A1 | 3/2011 | Carlen et al. |
| 2012/0204104 A1 | 8/2012 | Walsh |
| 2012/0210213 A1 | 8/2012 | Watanabe et al. |
| 2012/0210219 A1 | 8/2012 | Agnoli et al. |
| 2012/0290988 A1 | 11/2012 | Sun et al. |

OTHER PUBLICATIONS

"International Search Report & Written Opinion for PCT Patent Application No. PCT/US2014/020950", Mailed Date: Sep. 12, 2014, Filed Date: Mar. 6, 2014, 10 Pages.

* cited by examiner

VISUALLY REPRESENTING QUERIES OF MULTI-SOURCE DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Although computer systems have assisted with automating many functions, many other functions are still typically performed manually. Some tasks, such as, data collection and other repetitive tasks, are well suited for automation. Other tasks requiring more abstract reasoning, such as, data analysis or taking actions based on detected conditions within data, are less suited for automation. As such, these more abstract tasks are often performed manually by an information worker, for example, a data analyst. For large amounts of data, manually performing these types of tasks can take a significant amount of time For example, nodes within a distributed network can be configured to automatically record log data associated with their operational status. However, it may be difficult for another computer system to gain insight into trends or conditions within the collected data that indicate why a node failed or perhaps why a node is in the process or failing. Thus, to gain these types of insights an information worker may have to manually analyze the data. However, log data can include large amounts of unstructured data. As a result, the manual analysis of the log data can take hours, days, or even weeks.

BRIEF SUMMARY

The present invention extends to methods, systems, and computer program products for visually representing queries of multi-source data. A data set is accessed. The data set includes data combined from a plurality of different sources. A portion of the data is presented on a display device. A query term for searching the set of data is received. A visual cue is assigned to the query term. Presentation of the data set portion is supplemented by using the visual queue to visually indicate any occurrences of the query term within the data set portion. Visually indicating occurrences of the query highlights the volume of the query term within the data set portion.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
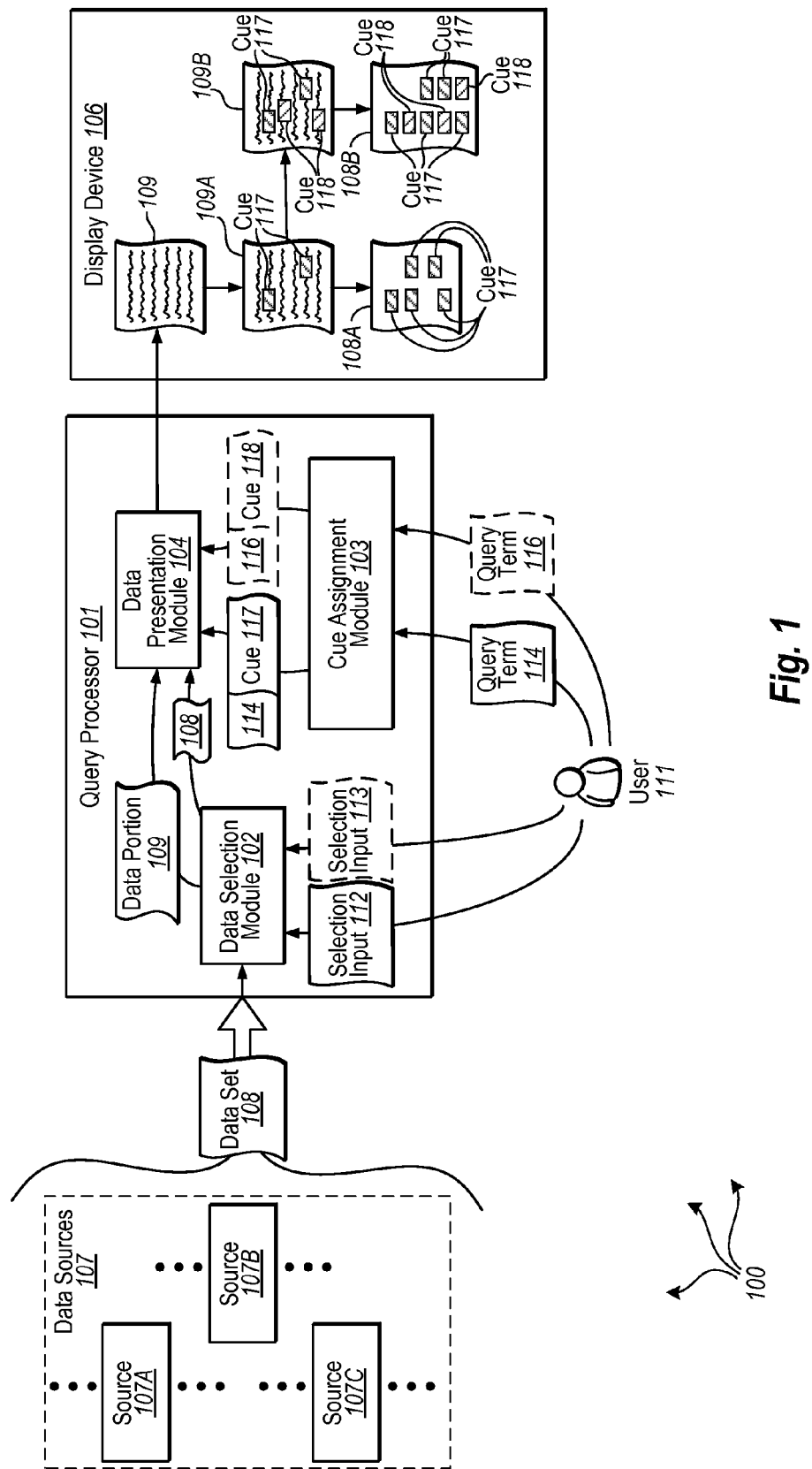
FIG. 1 illustrates an example computer architecture that facilitates visually representing queries of multi-source data.

The present invention extends to methods, systems, and computer program products for visually representing queries of multi-source data. A data set is accessed. The data set includes data combined from a plurality of different sources. A portion of the data is presented on a display device. A query term for searching the set of data is received. A visual cue is assigned to the query term. Presentation of the data set portion is supplemented by using the visual queue to visually indicate any occurrences of the query term within the data set portion. Visually indicating occurrences of the query term highlights the volume of the query term within the data set portion.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention can be used to visually represent queries of multi-source data. Visual cues can be used to help surface insights into data sets. For example, keywords can be assigned colors. Within a data set, the keywords can be presented as colored highlights (i.e., individual keywords can be displayed using different colors). Presentation of multiple colored highlighted keywords can be optimized for quick visual consumption. As such, a user can more easily determine the volume of keywords within a data set and can identify trends in keyword volume over time.

A "mountaintop view" of an entire data set can be presented to show highlighted words within the data set as color blocks without having to scroll. In mountaintop view, data from the data set may or may not be displayed along with the color blocks. For example, it may be that just color blocks are presented so as to give a user an indication of the visual volume of each keyword. The visual volume can be used to help identify trends within a data set without having to manually review the data set. In some embodiments, from a mountaintop view, a user can zoom in on (e.g., by clicking on or otherwise selecting) an area of interest within the data set.

In other embodiments, a bar chart is automatically created from a data set. The bar chart is used to present the volume of selected and/or other (but unselected) keywords within a data set. A keyword can be selected from the bar chart, for example, by clicking on the keyword. Once selected, the keyword can be assigned a color and corresponding color blocks can be used to indicate occurrences of the selected keyword within the data set.

Within this description and the following claims "unstructured data" is defined as data that requires further processing to distill the essential features or aspects of the data for further use. Further usage can include data analysis as well as general application consumption of the data. Unstructured data can include, but is not limited to, stock ticker data, sensor data, text, tweets, resumes, Web pages, hand written comments on a survey, doctor's notes, photos, movies, audio clips, and log data.

Embodiments of the invention can be used on data sets containing unstructured data to extract structure out of the unstructured data. For example, tweets can be processed to determine if they have positive or negative sentiment or if they are about particular individuals or corporations. Photos can be processed to determine if they have a familiar face in them. Audio clips can be processed to find clips that have references to keywords or phrases. Stock data can be processed to determine if there is a price discrepancy. Log data can be processed to determine the likelihood of a machine or service failure in the future. Doctor's notes can be processed to find all notes about a specific condition.

FIG. 1 illustrates an example computer architecture 100 that facilitates visually representing queries of multi-source data. Referring to FIG. 1, computer architecture 100 includes query processor 101 and display device 106. Each of query processor 101 and display device 106 can be connected to one another over a system bus or over (or be part of) a network, such as, for example, a Local Area Network ("LAN"), a Wide Area Network ("WAN"), and even the Internet. Accordingly, query processor 101 and display device 106 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, query processor 101 further includes data selection module 102, cue assignment module 103, and data presentation module 104. In general, query processor 101 can access a data set that combines data form a plurality of different sources. A data set can be accessed directly from a plurality of sources (e.g., other computer systems). In some embodiments, a data set is collected over time and stored at a storage device. Query processor 101 can access a data set from a storage device.

Selection input can be submitted (e.g., by a user or other computer system) to query processor 101. Data selection module 102 is configured to receive submitted selection input. Selection input can specify a portion of an accessed data set that is of interest. Based on selection input, data selection module 102 can select the specified data set portion for presentation. A specified data set portion can be sent to data presentation module. Selection input can include commands that cause zooming in or out to view more (and potentially all) or less of an accessed data set respectively.

Query terms (e.g., words, phrases, symbols, image characteristics, video characteristics, sound characteristics, etc.) can be submitted to query processor 101 to query a data set for occurrences of the query terms. Cue assignment module 103 is configured to receive submitted query terms. Cue assignment module 103 can assign visual cues to received query terms. Assigned visual cues can be sent to data presentation module 104. A visual cue can be a visually distinguishing characteristic, such as, for example, a color, used to highlight a corresponding query term within a data set or portion thereof.

Query processor 101 can include a user-interface for receiving user input. Users can enter selection input at the user-interface to select portions of a data set for viewing. Users can also enter query terms at the user-interface to query for words, phrases, symbols, image characteristics, video characteristics, sound characteristics, etc., within a data set.

Data presentation module 104 is configured to receive a specified portion of a data set and visual cues. Data presentation module 104 can apply the visual cues to the specified data set portion. Data presentation module 104 can present the specified data portion with the applied visual cues at a display device. For example, data presentation module 104 can highlight query terms in assigned colors when presenting a data set or portion thereof.

Upon viewing a presented data set or portion thereof, a user may desire to change (e.g., remove or add) query terms or may desire to change a zoom level. Query processor 101 can receive user input indicating such changes. When query terms are changed, cue assignment module 103 can adjust the assignment of visual cues to query terms. For example, if a query term is removed, occurrences of the query term may no longer be displayed with a visual cue. On the other hand, if a query term is added, occurrences of the query may be displayed with a visual cue.

When a zoom level is changed, the presented data set portion for which visual cues are displayed is corresponding changed. For example, when zooming out from a current zoom level, visual cues within addition portions of a data set can be presented. In some embodiments, zooming out includes zooming out to a mountaintop view that presents visual cues across an entire data set. After zooming out some specified amount, visual cues can be presented without data set content. Presenting visual cues without data set content allows a user to gain insight into query term volume without the clutter of data set content (e.g., text). Further, based on data set size and zoom level, data set content may not be presentable in a meaningful way. For example, when presenting a mountaintop view of hundreds of thousands of tweets, there may be no way to fit the content of all the tweets on a display device.

On the other hand, when zooming in from a current zoom level, portions of a data set can be removed from presentation.

Data presentation module 104 can present any changes to an existing view at a display device.

Figure 2:
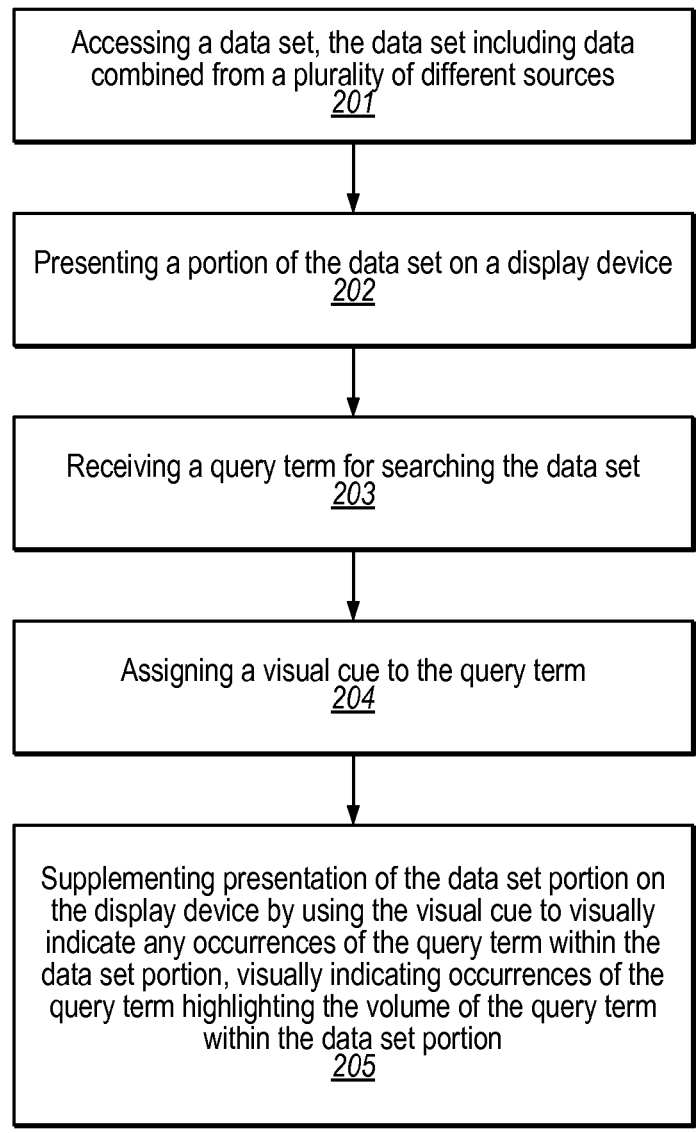
FIG. 2 illustrates a flow chart of an example method for visually representing queries of multi-source data.

FIG. 2 illustrates a flow chart of an example method 200 for visually representing queries of multi-source data. Method 200 will be described with respect to the components and data of computer architecture 100.

Method 200 includes accessing a data set, the data set including data combined from a plurality of different sources (201). For example, query processor 101 can access data set 108. Data set 108 can include data collected from data sources 107, including one or more of sources 107A, 107B, and 107C. The vertical ellipses within data sources 107 represents that other data sources can also be included. In some embodiments, data set 108 is a set of unstructured data. Data set 108 can include text, images, video, audio, etc. The wavy horizontal lines within data portion 109 represent that content of data portion 109 is also displayed.

Method 200 includes presenting a portion of the data set on the display device (202). For example, user 111 can submit selection input 112 to query processor 101. Data selection module 102 can receive selection input 112. Selection input 112 can indicate that user 111 desires to view data portion 109. Data selection module 102 can select data portion 109 from within data set 108 in response to receiving selection input 112. Data selection module 102 can send data portion 109 to data presentation module 104. Data presentation module 104 can present data portion 109 at display device 106.

Method 200 includes receiving a query term for searching the data set (203). For example, user 111 can submit query term 114 to query processor 101. Cue assignment module 103 can receive query term 114. Query term 114 can be a word, phrase, symbol, image characteristic, video characteristic, sound characteristics, etc. Method 200 includes assigning a visual cue to the query term (204). For example, cue assignment module 103 can assign cue 117, such as, for example, a color, to query term 114. Cue assignment module 103 can indicate to data presentation module 104 that cue 117 is assigned to query term 114.

Method 200 includes supplementing presentation of the data set portion on the display device by using the visual cue to visually indicate any occurrences of the query term within the data set portion, visually indicating occurrences of the query term highlighting the volume of the query term within the data set portion (205). For example, data presentation module 104 can receive the indication from cue assignment module 103 that cue 117 is assigned to query term 114. Data presentation module can supplement data portion 109 by visually indicating occurrences of query term 114 with data portion 109. Data presentation module 104 can present data portion 109A that includes data portion 109 supplemented by highlighting occurrences of query term 114 with cue 117 (e.g., a color). The wavy horizontal lines within data portion 109A represent that content of data portion 109 is also displayed.

Subsequent to presentation of data portion 109A, user 111 may desire to change how data set 108 is viewed. Changing how data set 108 is viewed can include changing the portion of data set 108 that is being viewed and/or changing the query terms to highlight within data set 108.

User 111 can submit selection input 113 to query processor 101 to change the portion of data set 109 that is being viewed. For example, user 111 may desire to view data set 108 in its entirety (a mountaintop view). As such, selection input 113 can indicate that data set 108 is to be presented. In response, data selection module 102 can send data set 108 to presentation module 104.

Data presentation module 104 can supplement data set 108 by visually indicating occurrences of query term 114 within data set 108. Data presentation module 104 can present data portion 108A by highlighting locations where query term 114 occurs with cue 117. As depicted, the content of data set 108 is not displayed. Even though the content of data set 108 is not displayed, cue 117 visually indicates the volume of query term 114 within data set 108.

Alternately, user 111 can submit query term 116 to query processor 101 to change the query terms that are highlighted within data portion 109. Cue assignment module 103 can receive query term 116. Cue assignment module 103 can assign cue 118 (e.g., a color that differs from the color of cue 117) to query term 116. Cue assignment module 103 can indicate to data presentation module 104 that cue 118 is assigned to query term 116.

Data presentation module 104 can receive the indication from cue assignment module 103 that cue 118 is assigned to query term 116. Data presentation module can supplement data portion 109A by visually indicating occurrences of query term 114 with data portion 109. Data presentation module 104 can present data portion 109B that includes data portion 109 supplemented by highlighting occurrences of query term 114 with cue 117 (e.g., a color) and occurrences of query term 116 with cue 118 (e.g., another different color). The wavy horizontal lines within data portion 109B represent that content of data portion 109 is also displayed.

In some embodiments, user 111 submits selection input 113 after submitting query term 116. In these embodiments, data presentation module 104 can supplement data set 108 by visually indicating occurrences of query term 114 and occurrences of query term 116 within data set 108. Data presentation module 104 can present data portion 108B by highlighting locations where query term 114 occurs with cue 117 and highlighting locations where query term 116 occurs with cue 118. As depicted, the content of data set 108 is not displayed. Even though the content of data set 108 is not displayed, cues 117 and 118 visually indicate the volume of query terms 114 and 116 respectively within data set 108.

FIGS. 3A-3F illustrate further examples of visually representing queries of multi-source data.

Figure 3A:
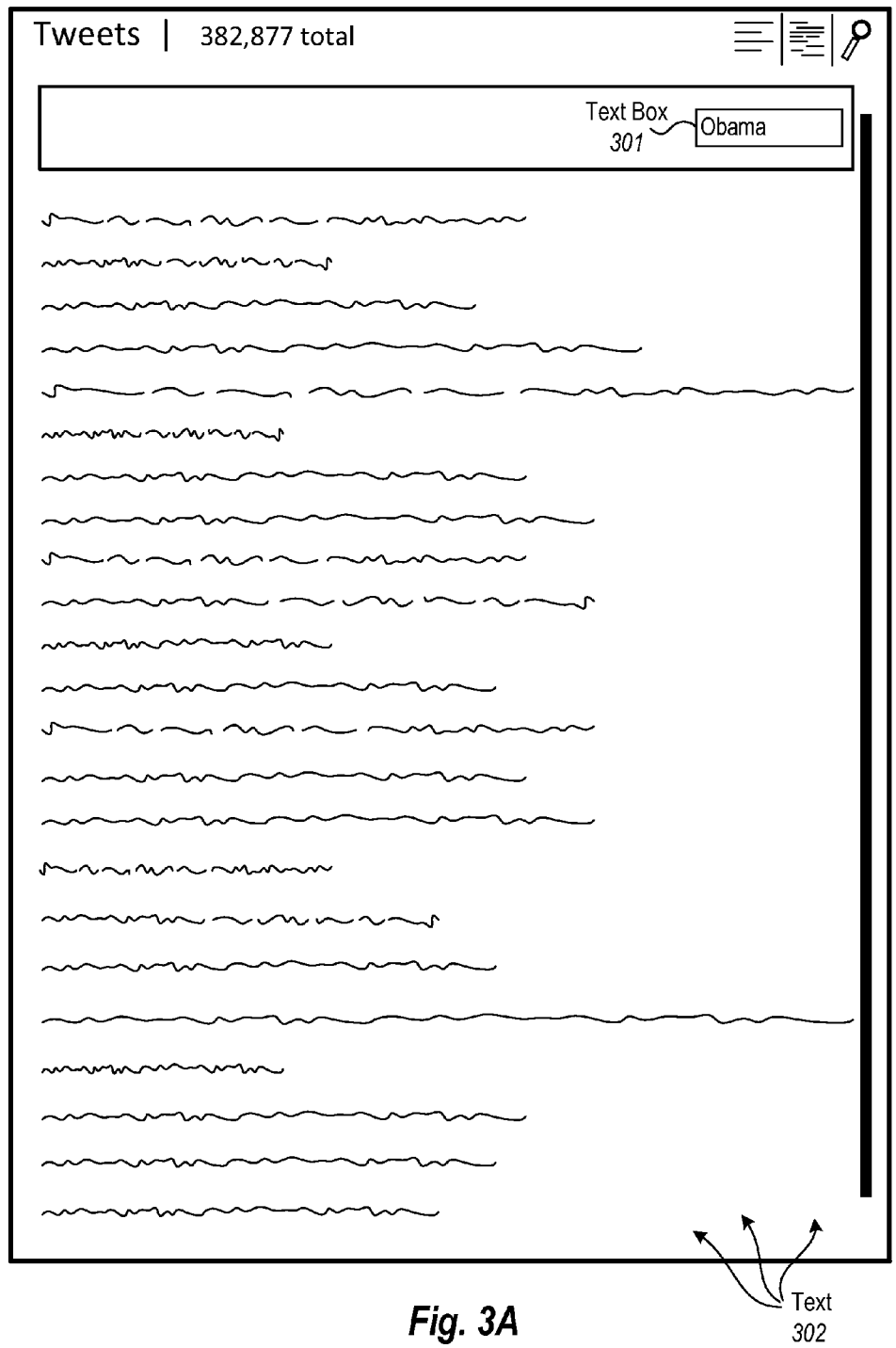
FIGS. 3A-3F illustrate further examples of visually representing queries of multi-source data.

FIG. 3A depicts text 302. Text 302 (indicated by the horizontal wavy lines) is text contained in a plurality of tweets (an example of unstructured data). The plurality of tweets can originate from a plurality of different users. In some embodiments, there are hundreds of thousands of tweets originating from tens or even hundreds of thousands of different sources.

Figure 3B:
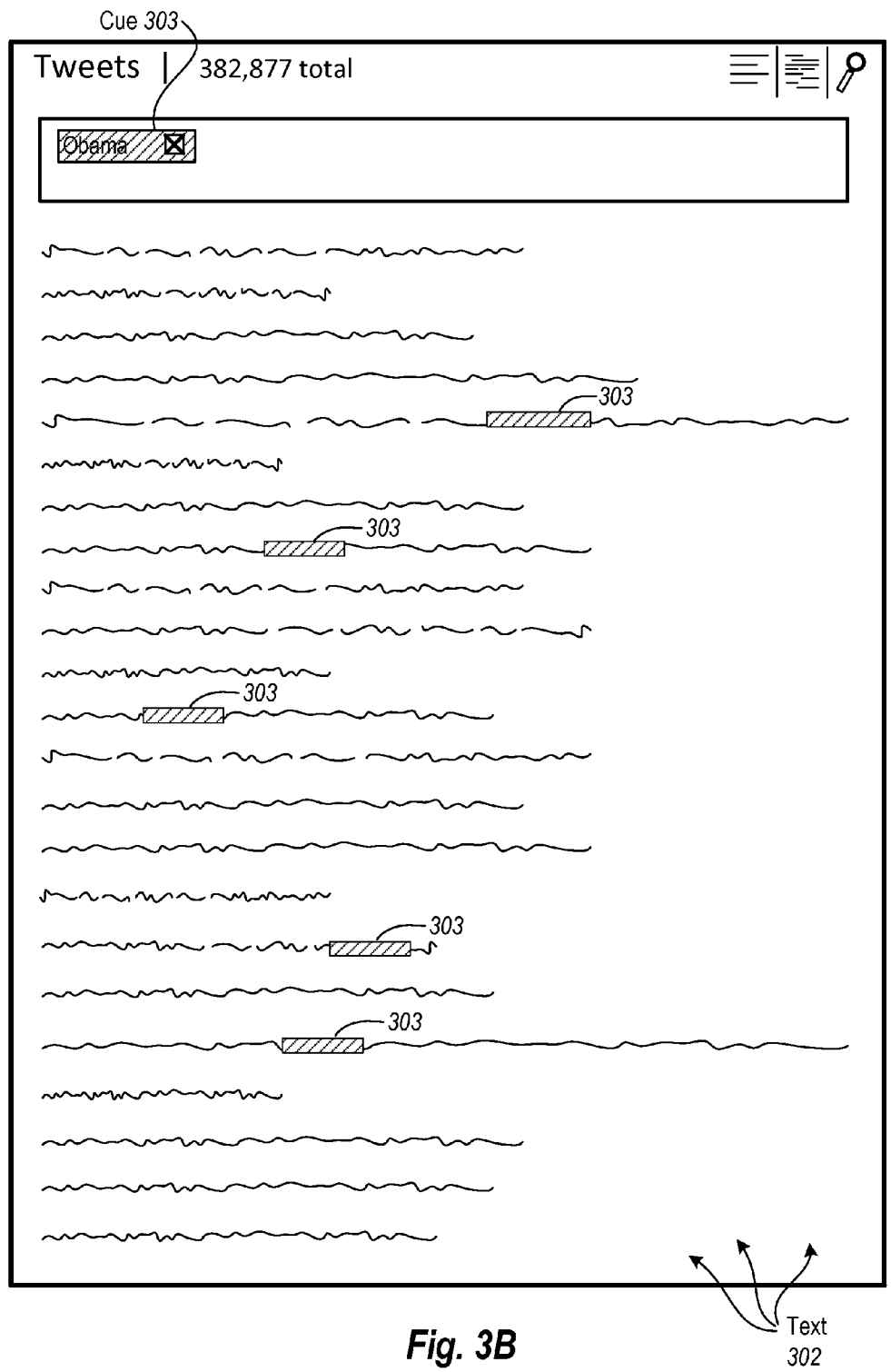
Figure 3C:
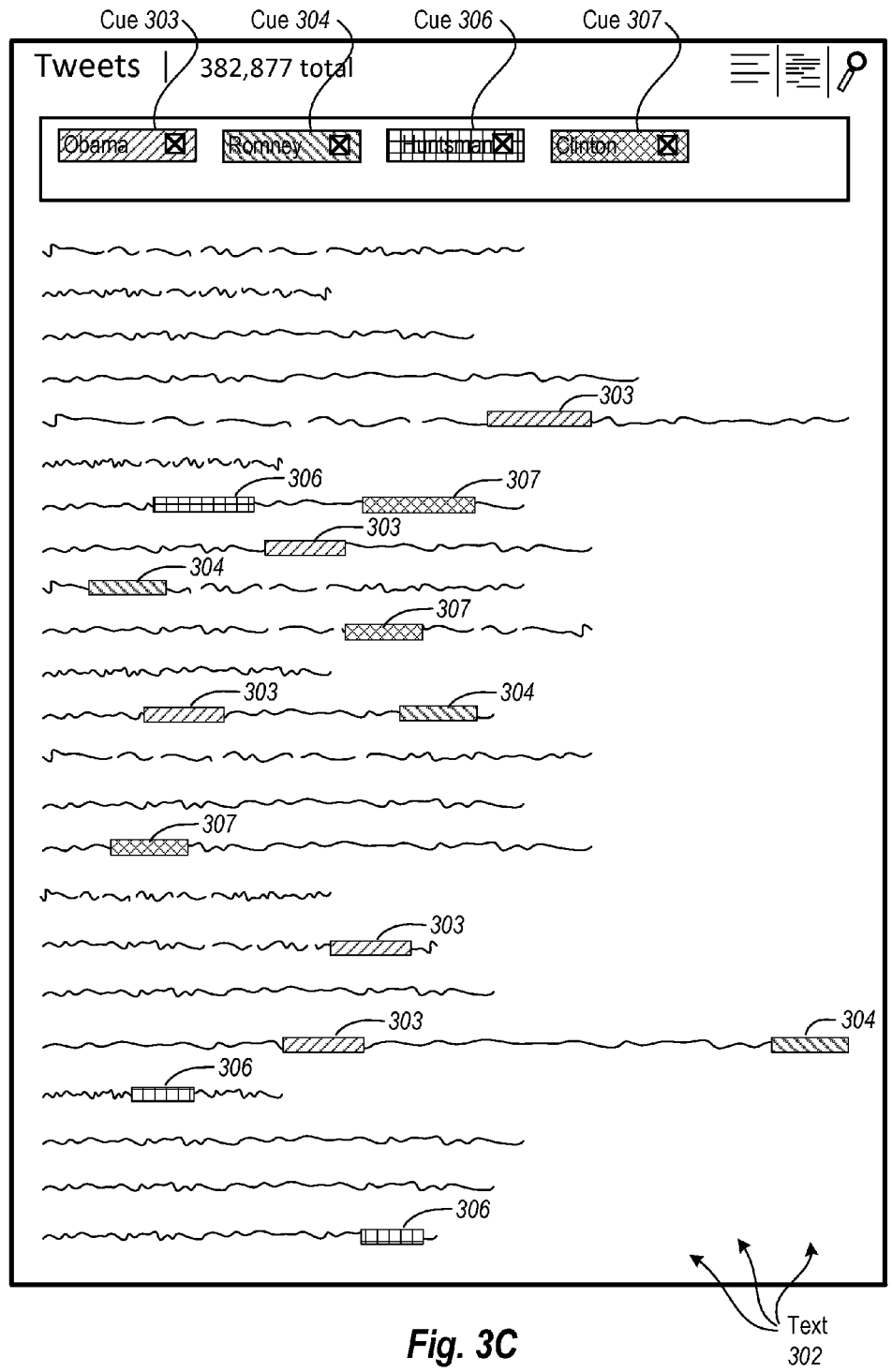

To search for a term within the plurality of tweets, a user can enter a query term in text box 301 to search for the query term (e.g., "Obama"). Searched query terms can be temporarily stored and highlighted with a visual cue (e.g., a color). Turning to FIG. 3B, cue 303 highlights occurrences of "Obama" within text 302. Uses can add additional query terms, which can be assigned different cues (e.g., different colors). Turning to FIG. 3C, query terms "Romney", "Huntsman", and "Clinton" as assigned cues 304, 306, and 307 respectively. Within text 302, cue 303 highlights occurrences of Obama, cue 304 highlights occurrences of "Romney", cue 306 highlights occurrences of "Huntsman", and cue 307 highlights occurrences of "Clinton".

Figure 3D:
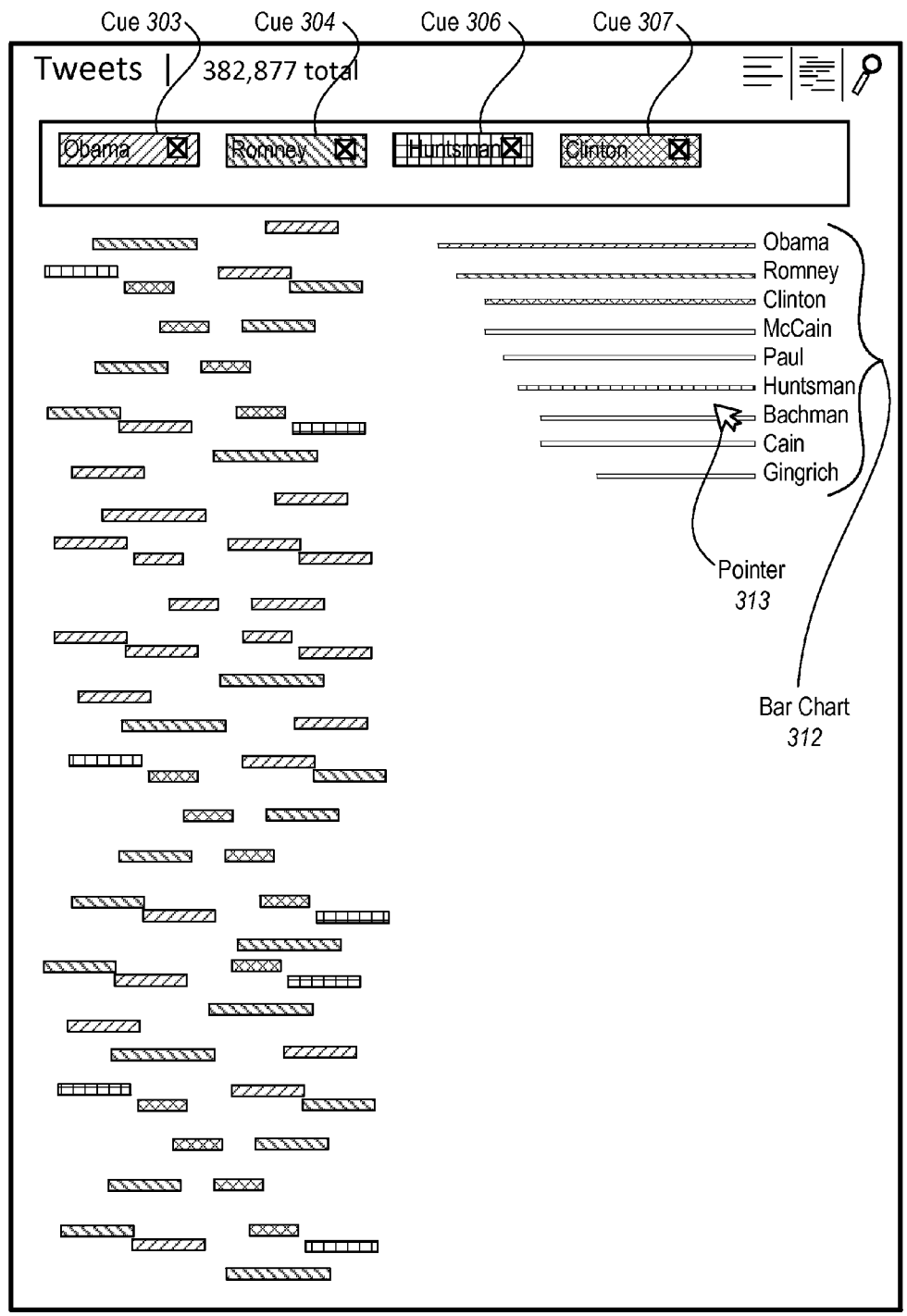

A user may desire to zoom out to see a higher-level (e.g., a mountaintop) view of (potentially all) the highlights, without scrolling through a large number of rows. Turning to FIG. 3D, FIG. 3D depicts a higher-level view of the plurality of tweets. Text 302 is removed. Within FIG. 3D, cue 303 highlights occurrences of Obama, cue 304 highlights occurrences of "Romney", cue 306 highlights occurrences of "Huntsman", and cue 307 highlights occurrences of "Clinton". From the higher-level view, a user may be able to identify trends or a cluster of interest.

Also depicted in FIG. 3D, is bar chart 312. Bar chart 312 indicates the volume of various terms within the plurality of tweets. For each term, the length of the line next to the term indicates the relative volume of the term within the plurality of tweets. Thus, the term "Obama" has the highest volume within the plurality of tweets. The term "Gingrich" has the lowest volume within the plurality of tweets. Lines for are active query terms (e.g., "Obama", "Romney", "Huntsman", and "Clinton") are depicted using their corresponding visual cue. Lines for terms that are not active query terms (e.g., "McCain", "Paul", "Bachman", "Cain", and "Gingrich") are depicted in gray.

In some embodiments, query processor 101 or a similar module can include functionality to automatically include some number of terms in a bar chart. Terms in a bar chart can include terms having higher volumes within a data set, whether or not the terms are selected as query terms.

Figure 3E:
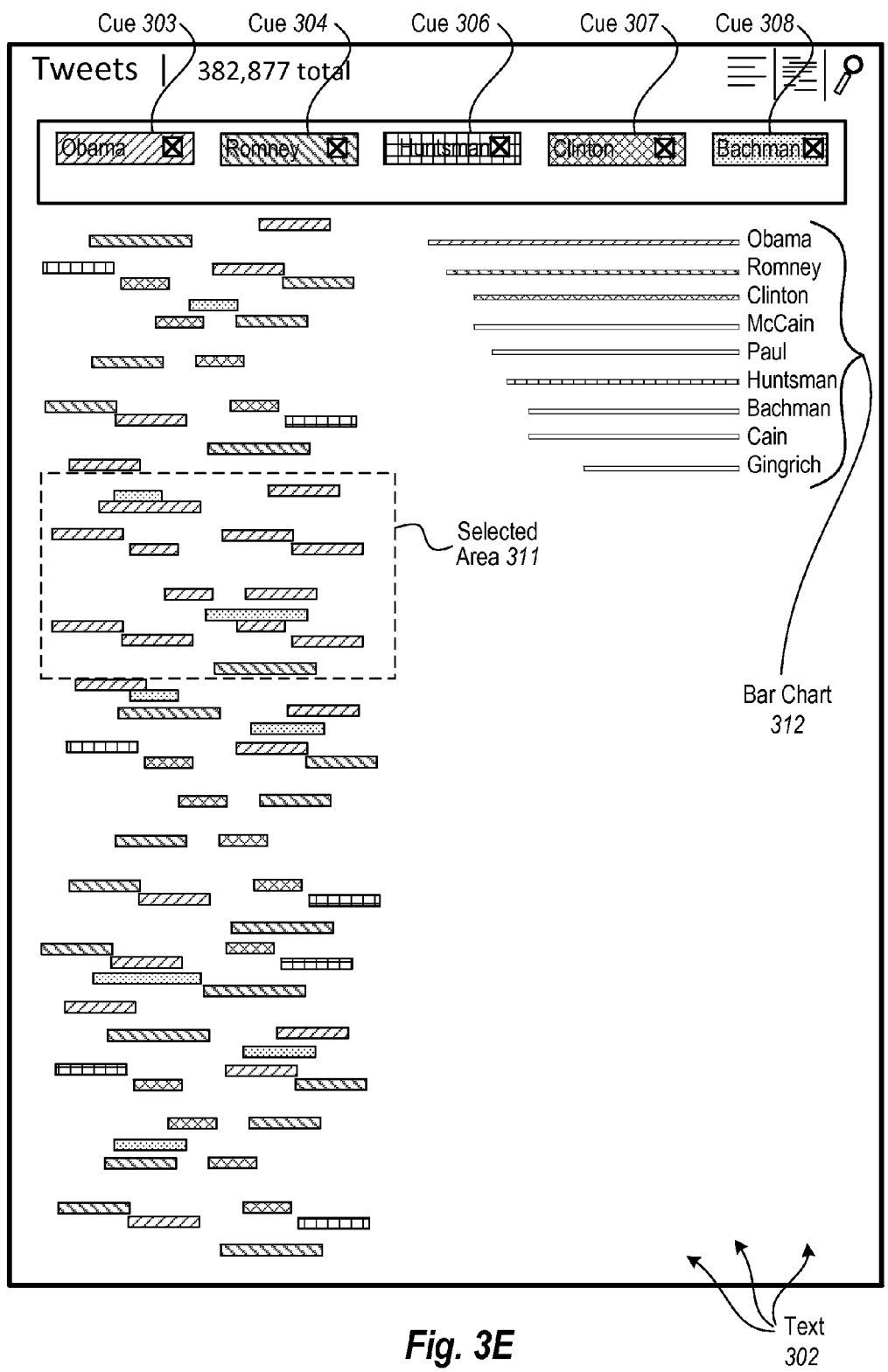

Generally, a bar chart can drive awareness to higher volume words a user may not be aware of. A user can click on one of the gray lines to add the term as an active query term. For example, in FIG. 3D, pointer 313 (e.g., a mouse pointer) is used to select "Bachman" as a query term. In response to selecting a term as a query term, a visual cue can be assigned to the term. Turning to FIG. 3E, the term "Bachman" is depicted as an active query term and is assigned cue 308 (e.g., a different color from that used for the other query terms). Cue 308 is used to highlight occurrences of the term "Bachman" within the plurality of tweets.

Figure 3F:
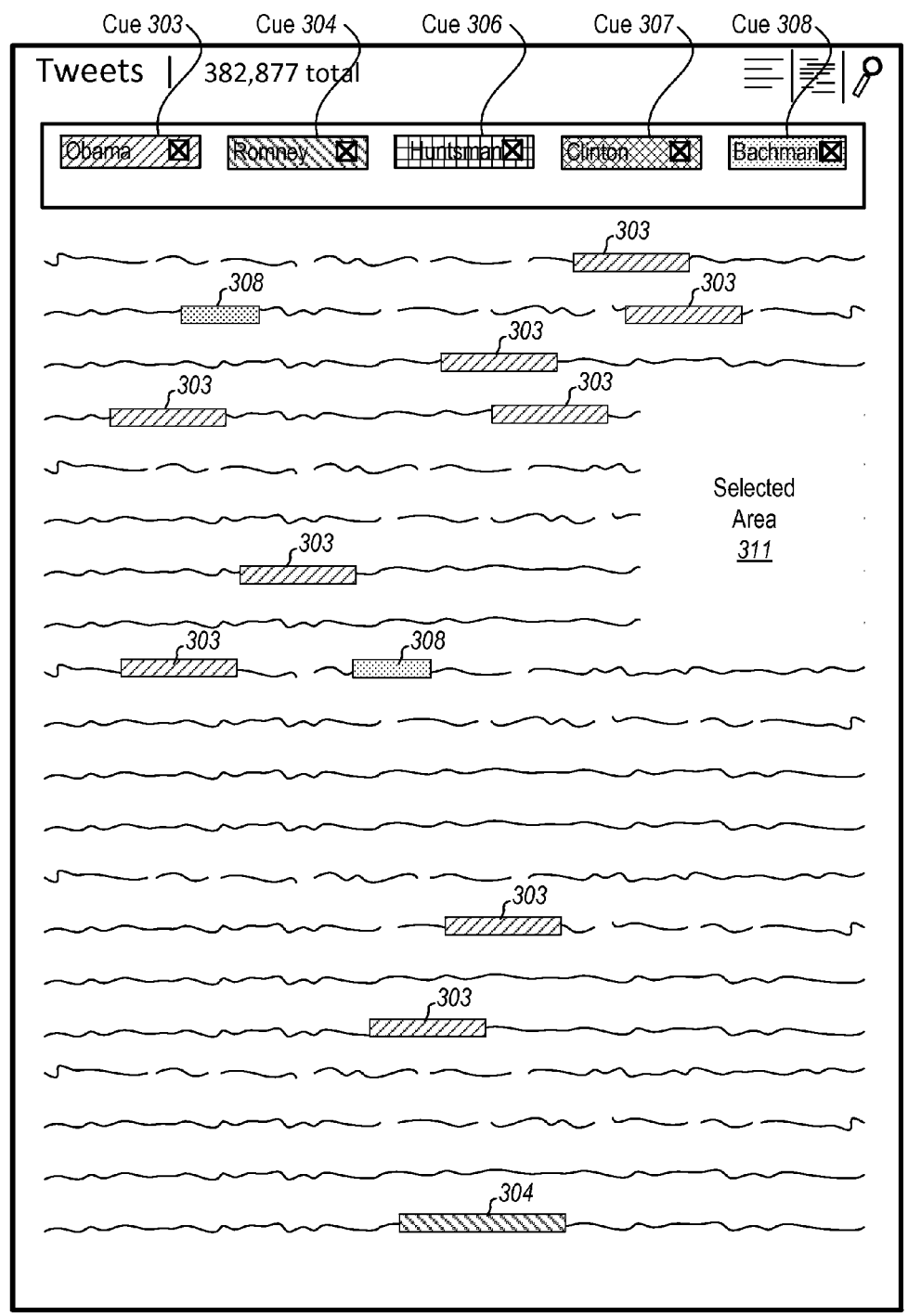

From a higher level view, a user can see clustering and possible trends. The user can select a portion of the data and zoom in on that data. Turning to FIG. 3E, selected area 311 has been selected by a user. Selected area 311 can be selected using pointer 313. Upon clicking on selected area 311, presentation of the plurality of tweets can be zoomed in on selected area 311. Turning to FIG. 3F, selected area 311 is shown in a zoomed in view. In this zoomed in view, text (indicated by the horizontal wavy lines) is again presented.

Thus, embodiments of the invention improve the usability of query mechanisms by showing query results for larger data sets. In some views, for example, a mountain top view, users are presented a graphical display of query term locations without the clutter of underlying data. As such, less screen space is used to provide full query results on a graphical user interface (GUI).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a display device, a method for visually representing a query of multi-source data, the method comprising:
   accessing a data set, the data set including data combined from a plurality of different sources;
   supplementing presentation of data contained in a portion of the data set on the display device by using a visual cue to visually indicate any occurrences of a query term within the data contained in the portion of the data set on the display device, visually indicating occurrences of the query term highlighting the volume of the query term within the data contained in the portion of the data set;
   receiving a command to query a larger portion of the data set for the query term, the larger portion of the data set including the portion of the data set;
   determining that data contained in the data set is not to be displayed on the display device in response to the command; and
   presenting the visual cue in an arrangement of locations on the display device to visually indicate occurrences of the query term in the data contained in the larger portion of the data set, each location in the arrangement of locations indicating where the query term would have be presented on the display device had the data contained in the larger portion of the data set been presented at the display device, presenting the arrangement of locations permitting insight into the volume of the query term in the data contained in the larger portion of the data set without consuming presentation space on the display device to present the data contained in the larger portion of the data set.

2. The method of claim 1,
   wherein receiving a command to query a larger portion of the dataset comprises receiving a command to zoom out to present the larger portion of the data set, the larger portion of the dataset including the portion of data set and additional data from the data set; and further comprising:
   removing presentation of data contained in the portion of the data set from the display device in response to determining that data contained in the data set is not to be displayed on the display device.

3. The method of claim 1, wherein receiving a command to query a larger portion of the dataset for the query term comprises receiving a command to query the entire data set for the query term.

4. The method of claim 1, wherein the visual cue is color.

5. The method of claim 1, further comprising:
   receiving a second query term for searching the data set; and
   assigning a second different visual cue to the second query term; and
   wherein supplementing presentation of data contained in the portion of the data set comprises supplementing presentation of the data contained in the portion of the data set by using the visual cue and the second different visual cue to visually indicate any occurrences of the query term and the second query term respectively within the data contained in the portion of the data set, visually indicating occurrences of the query term and the second query term within the data contained in the portion of the data set indicating the relative differences in volume between the query term and the second query term within the data contained in the portion of the data set.

6. The method of claim 5, wherein the visual cue is a color and the second different visual cue is a second different color.

7. The method of claim 5, further comprising presenting a bar chart on the display device, the bar chart indicating one or more query terms having a higher volume in the data contained in the data set relative to at least one other query term, the second query term included in the one or more query terms; and
   wherein receiving a second query term for searching the data set comprises receiving a selection of the second query term from the bar chart.

8. The method of claim 1, wherein the data contained in the data set comprises real time messaging data from a plurality of messaging users; and
   further comprising deriving a possible trend for the query term within the real time messaging data based on the arrangement of locations of the visual cue.

9. A computer program product for use at computer system, the computer system including a display device, the computer program product for implementing a method for visually representing a query of multi-source data, the computer program product comprising one or more computer storage devices having stored thereon computer-executable instructions that, when executed a processor, cause the computer system to perform the method, including the following:
   access a data set, the data set including data combined from a plurality of different sources;
   supplement presentation of data contained in a portion of the data set on the display device by using a visual cue to visually indicate any occurrences of a query term within the data contained in the portion of the data set on the display device, visually indicating occurrences of the query term highlighting the volume of the query term within the data contained in the portion of the data set;
   receive a command to query a larger portion of the data set for the query term, the larger portion of the data set including the portion of the data set;
   determine that data contained in the data set is not to be displayed on the display device in response to the command; and
   present the visual cue in an arrangement of locations on the display device to visually indicate occurrences of the query term in the data contained in the larger portion of the data set, each location in the arrangement of locations indicating where the query term would have be presented on the display device had the data contained in the larger portion of the data set been presented at the display device, presenting the arrangement of locations permitting insight into the volume of the query term in the data contained in the larger portion of the data set without consuming presentation space on the display device to present the data contained in the larger portion of the data set.

10. The computer program product of claim 9,
    wherein computer-executable instructions that, when executed, cause the computer system to receive a command to query a larger portion of the dataset comprise computer-executable instructions that, when executed, cause the computer system to receive a command to zoom out to present a larger portion of the data set, the larger portion of the dataset including the portion of data set and additional data from the data set; and further comprising:

computer-executable instructions that, when executed, cause the computer system to remove presentation of the data contained in the portion of the data set from the display device, in response to determining that data contained in the data set is not to be displayed on the display device.

11. The computer program product of claim 9, wherein computer-executable instructions that, when executed, cause the computer system to receive a command to query a larger portion of the dataset for the query term comprise computer-executable instructions that, when executed, cause the computer system to query the entire data set for the query term.

12. The computer program product of claim 9, wherein the visual cue is color.

13. The computer program product of claim 9, further comprising computer-executable instructions that, when executed, cause the computer system to:

receive a second query term for searching the data set; and assign a second different visual cue to the second query term; and wherein computer-executable instructions that, when executed, cause the computer system to supplement presentation of the data contained in the portion of the data set comprise computer-executable instructions that, when executed, cause the computer system to supplement presentation of the data contained in the portion of the data set by using the visual cue and the second different visual cue to visually indicate any occurrences of the query term and the second query term respectively within the data contained in the portion of the data set, visually indicating occurrences of the query term and the second query term within the data contained in the portion of the data set indicating the relative differences in volume between the query term and the second query term within the data contained in the portion of the data set.

14. The computer program product of claim 13, wherein the visual cue is a color and the second different visual cue is a second different color.

15. The computer program product of claim 13, further comprising computer-executable instructions that, when executed, cause the computer system to presenting a bar chart on the display device, the bar chart indicating one or more query terms having a higher volume in the data contained in the data set relative to at least one other query term, the second query term included in the one or more query terms; and wherein computer-executable instructions that, when executed, cause the computer system to receive a second query term for searching the data set comprise computer-executable instructions that, when executed, cause the computer system to receive a selection of the second query term from the bar chart.

16. The computer program product of claim 9, wherein the data contained in the data set comprises real time messaging data from a plurality of messaging users; and further comprising computer-executable instructions that, when executed, cause the computer system to derive a possible trend for the query term within the real time messaging data based on the arrangement of locations of the visual cue.

17. At a computer system, the computer system including a display device, a method for visually representing a query of multi-source unstructured data, the method comprising:

accessing a data set, the data set including unstructured data combined from a plurality of different sources;

supplementing presentation of unstructured data contained in a portion of the data set on the display device by using a visual cue to visually indicate any occurrence of a query term within the unstructured data contained in the portion of the data set on the display device, visually indicating occurrences of the query term highlighting the volume of the query term within the unstructured data contained in the portion of the data set;

receiving a command to query a larger portion of the data set for the query term, the larger portion of the data set including the portion of the data set;

determining that unstructured data contained in the data set is not to be displayed on the display device in response to the command; and presenting the visual cue in an arrangement of locations on the display device to visually indicate occurrences of the query term in the unstructured data contained in the larger portion of the data set, each location in the arrangement of locations indicating where the query term would have be presented on the display device had the unstructured data contained in the larger portion of the data set been presented at the display device, presenting the arrangement of locations permitting insight into the volume of the query term in the unstructured data contained in the larger portion of the data set without consuming presentation space on the display device to present the unstructured data contained in the larger portion of the data set.

18. The method as recited in claim 17, wherein receiving a command to query a larger portion of the data set comprises receiving a command to zoom out to a mountaintop view of the data set; and further comprising:

removing presentation of unstructured data contained in the portion of the data set from the display device in response to determining that unstructured data contained in the data set is not to be displayed on the display device.

19. The method of claim 18, further comprising:

receiving a selection of a second portion of the data set from within the mountaintop view; and highlighting locations within unstructured data contained in the second portion of the data set where the query term occurs with the visual cue, the visual cue visually indicating the volume of the query term within the unstructured data contained in the second portion of the data set.

20. The method as recited in claim 17, wherein accessing a data set comprises accessing a data set including one of: stock ticker data, sensor data, text, tweets, resumes, Web pages, hand written comments on a survey, doctor's notes, photos, movies, audio clips, and log data.

* * * * *